(12) United States Patent
Lai

(10) Patent No.: US 12,547,311 B2
(45) Date of Patent: Feb. 10, 2026

(54) MEMORY CONTROL SYSTEM AND MEMORY CONTROL METHOD

(71) Applicant: REALTEK SEMICONDUCTOR CORPORATION, Hsinchu (TW)

(72) Inventor: Chi-Shao Lai, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 118 days.

(21) Appl. No.: 18/530,263

(22) Filed: Dec. 6, 2023

(65) Prior Publication Data

US 2024/0220104 A1     Jul. 4, 2024

(30) Foreign Application Priority Data

Dec. 29, 2022 (TW) .................................. 111150698

(51) Int. Cl.
*G06F 3/00* (2006.01)
*G06F 3/06* (2006.01)

(52) U.S. Cl.
CPC .......... *G06F 3/0604* (2013.01); *G06F 3/0629* (2013.01); *G06F 3/0673* (2013.01); *G06F 3/061* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | |
|---|---|---|
| 11,269,797 B2 | 3/2022 | Lai |
| 2003/0217239 A1* | 11/2003 | Jeddeloh ................. G06F 12/14 711/158 |
| 2012/0155264 A1 | 6/2012 | Sharma et al. |
| 2013/0212319 A1* | 8/2013 | Hida .................... G06F 12/0246 711/103 |
| 2015/0019803 A1 | 1/2015 | Miller et al. |
| 2016/0139807 A1 | 5/2016 | Lesartre et al. |
| 2018/0364945 A1 | 12/2018 | Tseng |
| 2022/0382452 A1* | 12/2022 | Inbar ..................... G06F 3/0619 |
| 2023/0198865 A1 | 6/2023 | Mann |

FOREIGN PATENT DOCUMENTS

TW     I819635 B     10/2023

OTHER PUBLICATIONS

U.S. Appl. No. 18/196,620 (USPTO receipt date: May 12, 2023) Memory Control System and Memory Control Method (counterpart of TWI819635B).

(Continued)

*Primary Examiner* — Midys Rojas
(74) *Attorney, Agent, or Firm* — WPAT, PC

(57) ABSTRACT

A memory control system includes front-end circuitries, a traffic control circuitry, and back-end circuitries. Each of the front-end circuitries is configured to receive access requests from a corresponding device in devices, and sequentially output the access requests to be a corresponding one of first requests. The traffic control circuitry is configured to output the first requests to be second requests. The back-end circuitries are configured to adjust a task schedule of a memory according to the second requests, in which performances of the devices have different sensitivities to an access delay time of the memory.

20 Claims, 5 Drawing Sheets

(56) References Cited

OTHER PUBLICATIONS

Marc Greenberg, Architectural Options for LPDDR4 Implementation in Your Next Chip Design, 2016 Synopsys, Inc.
Li, Y., Akesson, B. & Goossens, K. Architecture and analysis of a dynamically-scheduled real-time memory controller. Real-Time Syst 52, 675-729 (2016).
AMBA Adaptive Traffic Profiles Specification, 2017, 2018, 2019 Arm Limited or its affiliates . . . .
Ashley Stevens, Quality of Service (QOS) in ARM® Systems: An Overview, Jul. 2014, 2014 ARM Limited.
D. Stiliadis and A. Varma, "Latency-rate servers: a general model for analysis of traffic scheduling algorithms," in IEEE/ACM Transactions on Networking, vol. 6, No. 5, pp. 611-624, Oct. 1998, doi: 10.1109/90.731196.

\* cited by examiner

MEMORY CONTROL SYSTEM AND MEMORY CONTROL METHOD

BACKGROUND OF THE INVENTION

1. Field of the Invention

The present disclosure relates to a memory control system. More particularly, the present disclosure relates to a memory control system and a memory control method for multi-channel memory.

2. Description of Related Art

Existing memory controllers often use the concept of decision tree(s) to adjust the access scheduling of a memory to achieve better stability and predictability. However, the decision tree is set by updating decision conditions according to known condition(s) through software or firmware. As a result, such memory controller is unable to instantaneously optimize the performance of devices that are more sensitive to delay time. Furthermore, in order to support multi-port and multi-channel applications, some approaches may employ more complex traffic control mechanisms to control the multi-channel memory. As a result, the overall system costs will be too high.

SUMMARY OF THE INVENTION

In some aspects, an object of the present disclosure is to, but not limited to, provide a memory control system and a memory control method that divide devices into multiple sets based on performance-delay relations.

In some aspects, a memory control system includes a plurality of front-end circuitries, a traffic control circuitry, and a plurality of back-end circuitries. Each of the plurality of front-end circuitries is configured to receive a plurality of access requests from a corresponding device in a plurality of devices, and sequentially output the plurality of access requests to be a corresponding one of a plurality of first requests. The traffic control circuitry is configured to output the plurality of first requests to be a plurality of second requests. The plurality of back-end circuitries are configured to adjust a task schedule of a memory according to the plurality of second requests, in which performances of the plurality of devices have different sensitivities to an access delay time of the memory.

In some aspects, a memory control method includes the following operations: receiving a plurality of access requests from each device in a plurality of devices, and sequentially outputting the plurality of access requests to be a corresponding one of a plurality of first requests; outputting the plurality of first requests to be a plurality of second requests, and transmitting the plurality of second requests to a memory, in which performances of the plurality of devices have different sensitivities to an access delay time of the memory; and adjusting a task schedule of the memory according to the plurality of second requests.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system implemented with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, similar/identical elements in various figures are designated with the same reference number.

Figure 1A:
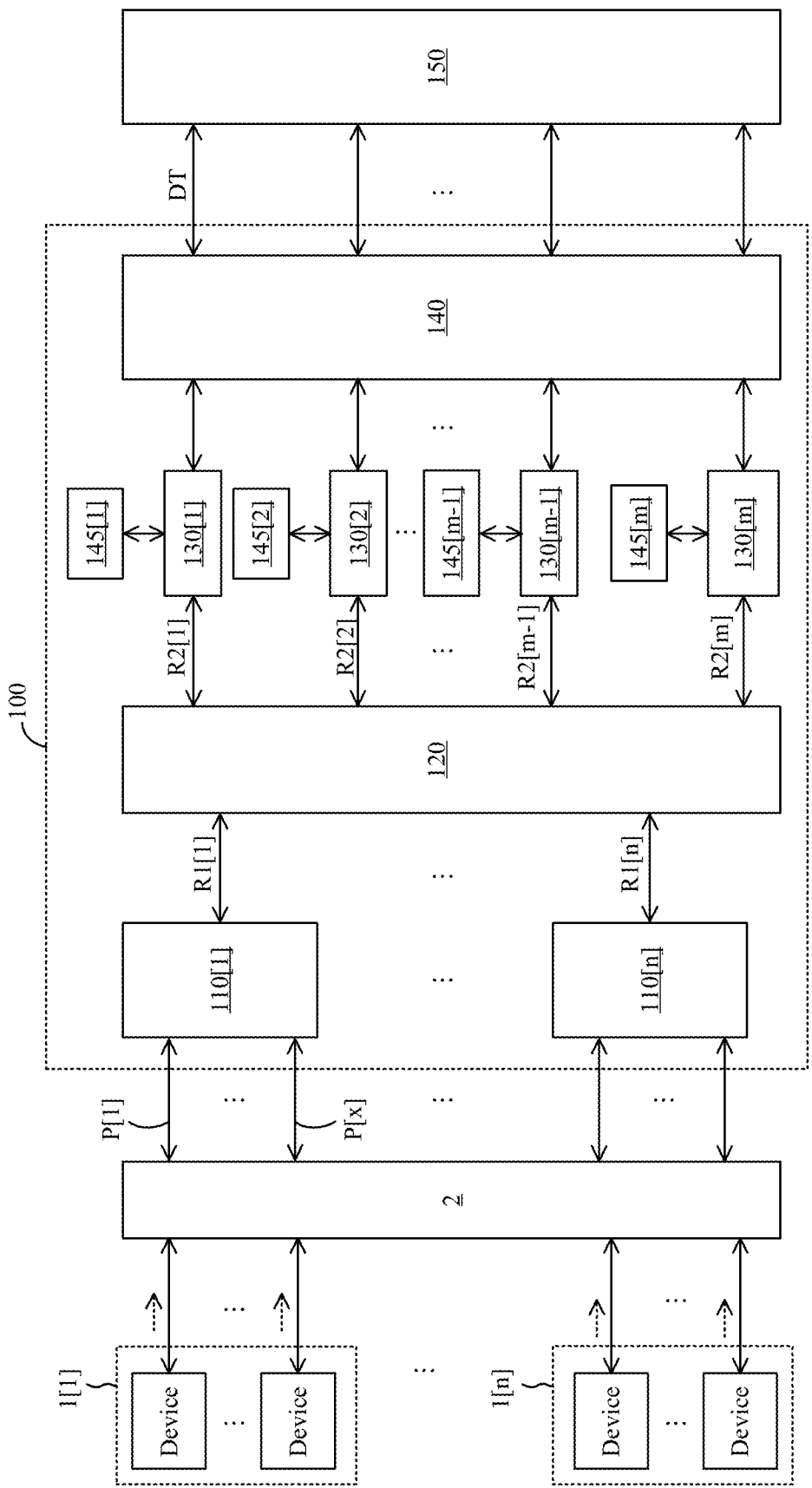
FIG. 1A illustrates a schematic diagram of a memory control system according to some embodiments of the present disclosure.

FIG. 1A illustrates a schematic diagram of a memory control system 100 according to some embodiments of the present disclosure. In some embodiments, the memory control system 100 can be implemented with a system-on-chip. In some embodiments, the memory control system 100 may adjust a task schedule of a memory 150 and an order of sets of devices 1[1]-1[n] accessing the memory 150 according to requirements of those sets of devices 1[1]-1[n]. In some embodiments, the number of devices in each set of devices 1[1]-[n] may be one or more.

The memory control system 100 includes front-end circuitries 110[1]-110[n], a traffic control circuitry 120, back-end circuitries 130[1]-130[m], a port physical layer circuitry 140, and data buffer circuitries 145[1]-145[m]. In some embodiments, each of values of n and m may be positive integers greater than 1. Each of the front-end circuitries 110[1]-110[n] may be coupled to a corresponding one of the device sets 1[1] to 1[n] through connection ports. For example, the front-end circuitry 110[1] may be coupled to an interconnection circuit 2 through connection ports P[1]-P[x]

(which may be virtual channels), and then coupled to the first set of devices 1[1] through the interconnection circuitry 2, in which the value x is a positive integer greater than 1. In some embodiments, different sets of devices 1[1]-1[$n$] have varying sensitivities to the access delay time of the memory 150. For example, the performance of the first set of devices 1[1] has a first sensitivity to the access delay time of the memory 150, while the second set of devices 1[2] has a second sensitivity, in which the first sensitivity is greater than the second sensitivity. In other words, devices having similar or the same sensitivity to the access delay time of the memory 150 are divided into the same set and controlled by the same front-end circuitry. Details regarding sensitivity will be provided with reference to FIG. 2. In certain embodiments, the interconnection circuitry 2 may include various types of bus circuitries. For example, the interconnection circuitry 2 may include, but is not limited to, an advanced extensible interface circuit.

In some embodiments, the performance of a first device has a first sensitivity to the access delay time of the memory 150, and the performance of a second device has a second sensitivity to the same. If the difference between the first sensitivity and the second sensitivity is within or equal to a predetermined range, the first and second sensitivities can be considered similar or identical, thus the first and second devices are grouped together (i.e., divided into the same set). For example, the predetermined range may be, but is not limited to, ±5%, ±10%, and/or ±20%. Alternatively, if both of the first and second sensitivities have a similar or identical relationship between performance and delay time (as discussed below), the first and second sensitivities can be considered as similar or identical sensitivities, and thus the first and second devices are grouped together.

Each of the front-end circuitries 110[1]-110[$n$] may receive access requests from a corresponding set of devices (shown with dotted arrows) and sequentially output these access requests to be one of requests R1[1]-R1[$n$]. For example, the front-end circuitry 110[1] may receive access requests from the first set of devices 1[1], reorder the access requests, and sequentially output the reordered access requests to be the request R1[1]. By this analogy, it is able to understand corresponding correlations among other sets of devices 1[2]-1[$n$], the front-end circuitries 110[2]-110[$n$], and the requests R1[2]-R1[$n$]. In some embodiments, the requests R1[1]-R1[$n$] may be out-of-order data response requests converted by the front-end circuitries 110[1]-110[$n$] according to the access characteristics of the memory 150. In some embodiments, each of the front-end circuitries 110[1]-110[$n$] may set abilities of the sets of devices 1[1]-1[$n$] to process data sorting according to the requirements of the sets of devices 1[1]-1[$n$].

In some embodiments, the implementation of each of the front-end circuitries 110[1]-110[$n$] may be understood with reference to a first patent document (U.S. Pat. No. 11,269,797) and/or a second patent document (Taiwan Patent No. TW I819635B; its US counterpart application: U.S. Application No. U.S. Ser. No. 18/196,620). Taking the front-end circuitry 110[1] as an example, in some embodiments, the front-end circuitry 110[1] may include a read re-order buffer in the first patent document, which may segment the reordered access requests (e.g., request R1[1]) in a fixed burst length, and assign a unique identifier tag as an index for accessing the read re-order buffer. In some embodiments, the fixed burst length is corresponding to transmission bandwidth of the read re-order buffer. For example, the fixed burst length may be, but is not limited to, 64 bytes. With such configurations, the data capacity of the read re-order buffer may be set to meet a maximum data throughput requirement of the first set of devices 1[1] only, without concerning about the data throughput returned the back-end circuitries 130[1]-130[$m$]. In other words, according to practical needs, the data capacities of the read re-order buffers in the front-end circuitries 110[1]-110[$n$] may be different from others.

In some embodiments, the front-end circuitry 110[1] may include read re-order buffers which may be coupled respectively to the connection ports P[1]-P[x] that are connected to the corresponding set of devices 1[1]. In some other embodiments, the front-end circuitry 110[1] may include one read re-order buffer which may be connected to at least one port for connecting to the traffic control circuitry 120. In some embodiments, the read re-order buffer may employ techniques (e.g., tap ID mapping) in the first patent document to further reduce the required data capacity of the read re-order buffer. In some embodiments, the term "request" in the present disclosure may be analogous to the term "transaction" in the first patent document. Detailed configurations and operations of the read re-order buffer may be understood with reference to the first patent document, and thus the detailed descriptions will not be given herein.

On the other hand, in some embodiments, the front-end circuitry 110[1] may also include a traffic scheduling circuitry in the second patent document, which may determine the output sequence of the access requests from the first set of devices 1[1] according to information including, for example, a quality of service (QOS) level, the expiration value of access, the upper limit of outstanding requests, and performance delay of each of the connection ports P[1]-P[x]. Detailed configurations and operations of the traffic scheduling circuitry may be understood with reference to the second patent document, and thus the detailed descriptions will not be given herein.

The traffic control circuitry 120 may be configured to output the requests R1[1]-R1[$n$] to be requests R2[1]-R2[$m$]. In some embodiments, the traffic control circuitry 120 may operate as a network-on-chip, which may act as a high-speed bus between the front-end circuitries 110[1]-110[$n$] and back-end circuitries 130[1]-130[$m$]. In some embodiments, the traffic control circuitry 120 may relay the requests R1[1]-R1[$n$] to the back-end circuitries 130[1]-130[$m$] according to a uniform memory access architecture. Thus, the sets of devices 1[1]-1[$n$] may access the memory 150 that has multi-channel through the memory control system 100. As mentioned above, performances of the sets of devices 1[1]-1[$n$] have different sensitivities to the access delay time of the memory 150. In some embodiments, a corresponding set of devices in those sets of devices 1[1]-1[$n$] (e.g., the first set of devices 1[1]) may be coupled to the memory 150 through at least one path, which has the lowest delay, of the traffic control circuitry 120, in which this corresponding set of devices has the highest sensitivity to the access delay time of the memory 150. As a result, the requirement for minimal access delay to the memory 150 for the performance of that corresponding set of devices is met, in order to keep the performance of that corresponding set of devices. In some embodiments, the requests R2[1]-R2[$m$] may be requests sorted by the traffic control circuitry 120, which may have out-of-order data response capability.

In greater detail, if the access delay time of the memory 150 increases, the performance of the corresponding device becomes significantly lower (for example, as depicted in FIG. 3A of the second patent document). The performance of this type of device is highly sensitive to the access delay time of the memory 150. In some embodiments, this type of device may include a central processing unit, a circuit that needs to maintain consistency with the cache memory in the system, and so on. If the access delay time of the memory 150 exceeds a predetermined value (e.g., a minimum bandwidth requirement), the performance of the corresponding device starts to be lower (as shown in FIG. 3B of the second patent document). The performance of this type of device has a lower sensitivity to the access delay time of the memory 150 (compared with the aforementioned central processing unit). In some example, this type of device may include a graphics processing unit, a data engine, a direct memory access controller, and so on. If the access delay time of the memory 150 exceeds a predetermined value (e.g., a minimum bandwidth requirement), the operation of the corresponding device instantly fails (as illustrated in FIG. 3C of the second patent document). This type of device typically has real-time performance requirements concerning the access delay time of the memory 150. If the access delay is determined to approach this predetermined value, the QoS level of the device is going to be set to be the highest level (e.g., set to have the highest priority). In some embodiments, this type of device may include a display, a video controller, and so on.

In some embodiments, devices that may access to memory 150 may be divided into multiple sets according to the aforementioned relationship between performance and delay. For instance, the first set of devices 1[1] may include, but not limited to, the central processing unit in the system or circuit(s) having the consistency with the cache memory, and so on. The second set of devices 1[2] may include, but not limited to, display(s), video controller(s), and the like. The nth set of devices 1[n] may include, but not limited to, graphic processing unit(s), data engine(s), and/or direct memory access controllers. Through such an arrangement, devices with the same or similar sensitivities can be divided into the same set and preliminarily arbitrated via the same front-end circuitry. As a result, the design complexity of the front-end circuitries 110[1]-110[n] can be reduced.

The back-end circuitries 130[1]-130[m] are coupled to the memory 150 via the port physical layer circuitry 140. Specifically, these back-end circuitries 130[1]-130[m] are respectfully coupled to multiple channels of the memory 150 through the port physical layer circuitry 140, in order to adjust the task schedule of the memory 150 according to the requests R2[1]-R2[m]. In some embodiments, the port physical layer circuitry 140 includes interface circuits (not shown), which are respectively coupled between the back-end circuitries 130[1]-130[m] and the multiple channels of the memory 150. In some embodiments, the port physical layer circuitry 140 may include a data transceiver circuit, a clock/power management circuit, a command/address control circuit, a data queue circuits, etc., in order to operate as the communication medium between the back-end circuitries 130[1]-130[m] and the memory 150. In some embodiments, the back-end circuitries 130[1]-130[m] may perform a memory protocol conversion on the requests R2[1]-R2[m] (which may include, but are not limited to, operations of confirming burst type, length, aligned addresses, etc.), such that the port physical layer circuitry 140 is able to recognize the format of the requests R2[1]-R2[m], and may utilize the aforementioned unique tag codes to reorder the output sequence of these requests R2[1]-R2[m], thereby adjusting the task schedule of the memory 150. Detailed implementations and operations about the back-end circuitries 130[1]-130[m] and the port physical layer circuitry 140 may be understood with reference to the first and second patent documents, and thus further elaboration is not given herein.

The data buffer circuits 145[1]-145[m] are respectively coupled to the back-end circuitries 130[1]-130[m]. In this example, each of the data buffer circuits 145[1]-145[m] is employed by a corresponding one of the back-end circuitries 130[1]-130[m]. For example, the back-end circuitry 130[1] may employ the data buffer circuit 145[1]. If the access request R2[1] is a read request, the back-end circuitry 130[1] may read data DT from the memory 150 in response to the access request R2[1]. When the back-end circuitry 130[1] is unable to transmit this data DT to a circuit portion that is coupled to the back-end circuitry 130[1] in the traffic control circuitry 120 (for example, when the circuit portion cannot receive any data DT), the back-end circuitry 130[1] may temporarily store the data DT in the corresponding data buffer circuit 145[1]. Once the circuit portion is able to receive the data DT, the back-end circuitry 130[1] may transfer the data DT from the data buffer circuit 145[1] to that circuit portion. In this way, the scheduling performance of the memory 150 is prevented from being affected, and it ensures that no data DT is missed.

In some embodiments, each of the data buffer circuits 145[1]-145[m] may be a First-In-First-Out (FIFO) circuit, but the present disclosure is not limited thereto. In some embodiments, the memory 150 may be, but not limited to, a synchronous dynamic random-access memory (SDRAM).

Figure 1B:
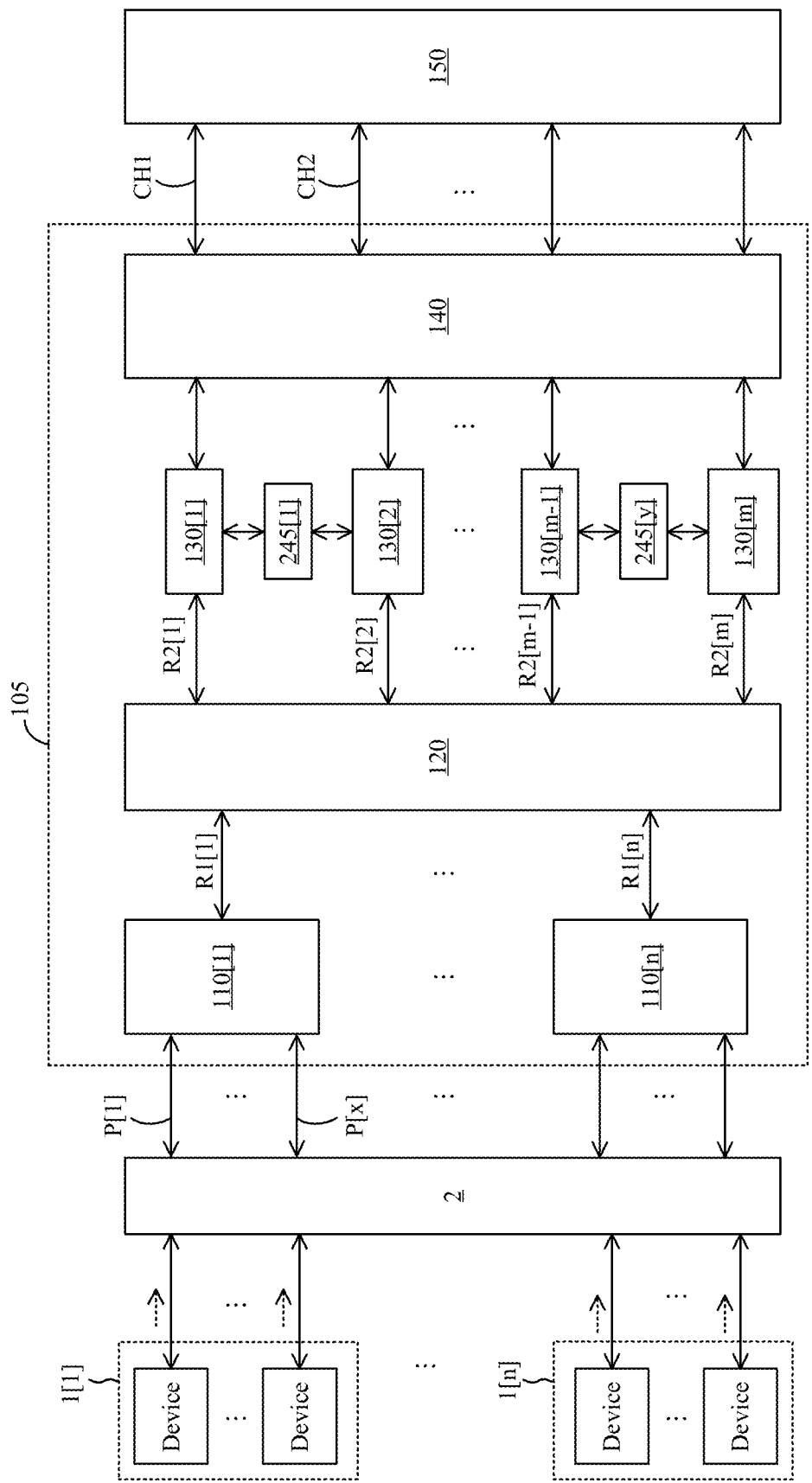
FIG. 1B illustrates a schematic diagram of a memory control system according to some embodiments of the present disclosure.

FIG. 1B illustrates a schematic diagram of a memory control system 105 according to some embodiments of the present disclosure. In this example, the number of data buffer circuits employed by the memory control system 105 is fewer than the configuration in FIG. 1A. The memory control system 105 includes data buffer circuits 245[1]-245[y], in which the value y is a positive integer greater than 1 and less than the value m.

In this example, at least two of the back-end circuitries 130[1]-130[m] may share one of the data buffer circuits 245[1]-245[y]. For example, the data buffer circuit 245[1] is coupled between the back-end circuitries 130[1] and 130[2], and both of the back-end circuitries 130[1] and 130[2] may share the data buffer circuit 245[1]. The back-end circuitries 130[1] and 130[2] that share the same data buffer circuit 245[1] are coupled to at least two adjacent channels of the memory 150 (e.g., channel CH1 and channel CH2). These at least two adjacent channels have similar or identical data transmission frequencies and have similar or identical data throughput to reduce the likelihood of data access blockages. Similarly, the back-end circuitries 130[m−1] and 130[m] may share the data buffer circuit 245[m]. By sharing the same data buffer circuit, it is able to further decrease circuit area and costs.

Figure 2:
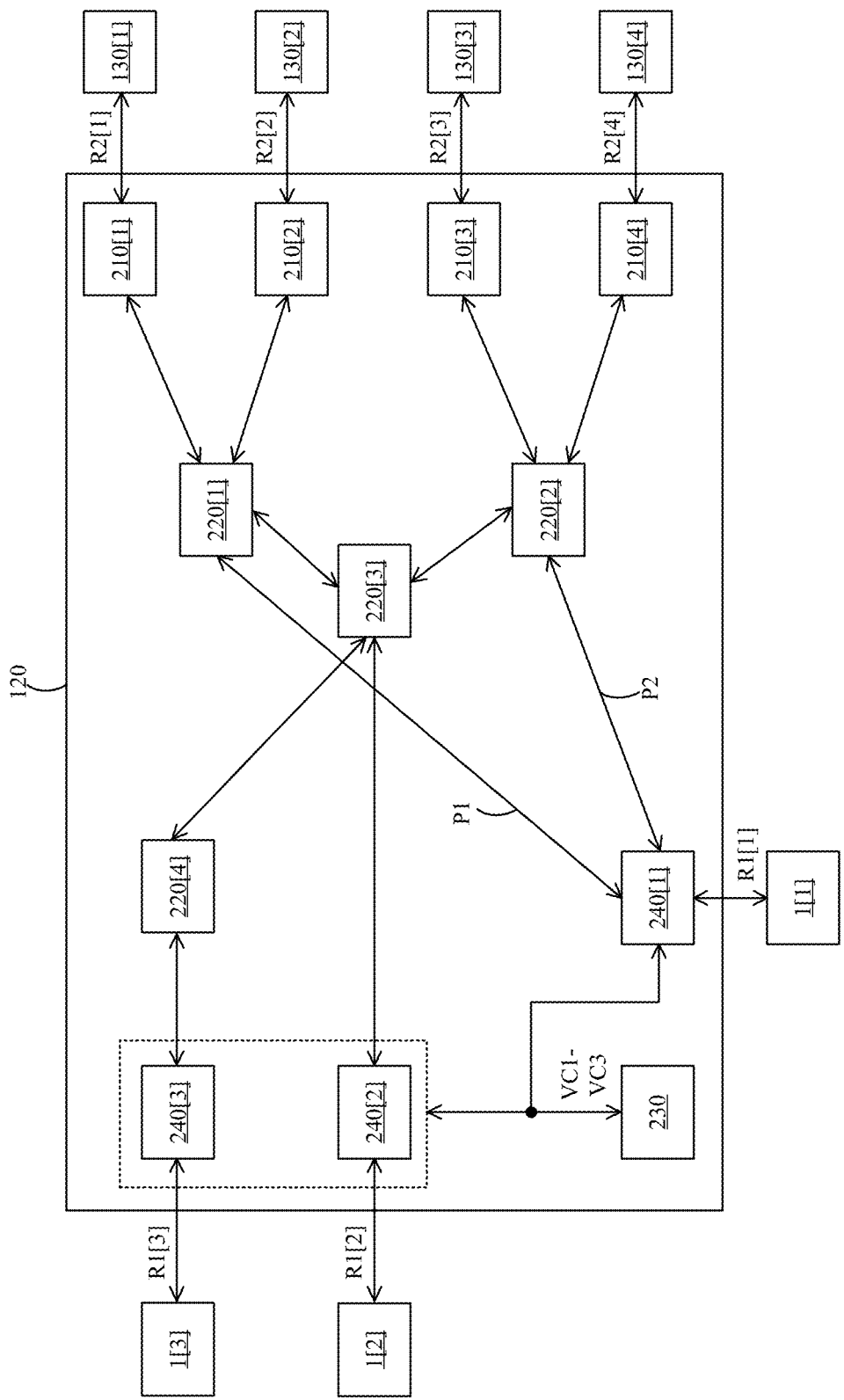
FIG. 2 illustrates a schematic diagram of the traffic control circuitry in FIG. 1A or 1B according to some embodiments of the present disclosure.

FIG. 2 illustrates a schematic diagram of the traffic control circuitry 120 in FIG. 1A or 1B according to some embodiments of the present disclosure. For ease of understanding, in the example of FIG. 2, the value of m is 4 and the value of n is 3, but the present disclosure is not limited thereto. The traffic control circuitry 120 includes target agent circuits 210[1]-210[4], transmission circuits 220[1]-220[4], a traffic scheduling circuit 230, and arbitrator circuits 240[1]-240[3]. Moreover, the first set of devices 1[1] are devices with the highest sensitivity (which may include, for example, a central processing unit and/or devices having consistency with cache memory). The second set of devices 1[2] are devices with real-time requirements for access delay (which may include, for example, displays and video controllers). The third set of devices 1[3] includes graphic processing unit(s), data engine(s), and direct memory access controller(s).

The target agent circuits 210[1]-210[4] are respectively coupled to the back-end circuitries 130[1]-130[m] in FIG. 1A or 1B (in this example, the value m is 4) and output the requests R1[1]-R1[3] to be the requests R2[1]-R2[4]. The transmission circuit 220[1] is coupled to the target agent circuits 210[1] and 210[2]. The transmission circuit 220[2] is coupled to the target agent circuits 210[3] and 210[4]. The transmission circuit 220[3] is coupled to the transmission circuits 220[1] and 220[2]. The transmission circuit 220[4] is coupled to the transmission circuit 220[3]. The transmission circuits 220[1]-220[4] may transmit the received requests to at least corresponding one of the target agent circuits 210[1]-210[4].

In some embodiments, each of the transmission circuits 220[1]-220[4] may include a router (not shown) and a switch (not shown). The router is configured to handle data transmission paths and requests from the target agent circuits 210[1]-210[4] and/or the arbitrator circuits 240[1]-240[3], and the switch is configured to manage or schedule of the data transfer sequence of the transmission circuits 220[1]-220[4]. In some embodiments, the router may utilize a lookup table to transmit data. For example, the received request may be processed according to an address mapping of read address channel and/or write address channel, and the lookup table is searched according to identification tags of read data channel and/or write response channel to generate a corresponding response.

The arbitrator circuits 240[1]-240[3] are configured to output requests R1[1]-R1[3] to the transmission circuits 220[1]-220[4] according to control signals VC1-VC3. The arbitrator circuit 240[1] may reorder the received requests R1[1] according to the control signal VC1 and sequentially transmit the reordered requests R1[1] to the transmission circuits 220[1] and/or 220[2]. The arbitrator circuit 240[2] may reorder the received requests R1[2] according to the control signal VC2 and sequentially output the reordered requests R1[2] to the transmission circuit 220[3]. The arbitrator circuit 240[3] may reorder the received requests R1[3] according to the control signal VC3 and sequentially output the reordered requests R1[3] to the transmission circuits 220[1] and/or 220[2].

In some embodiments, each of the arbitrator circuits 240[1]-240[3] may re-order the received requests according to priorities of the received requests. As a result, the access request(s) with higher priority will be outputted first to the corresponding transmission circuit, without being limited by access request(s) with lower priority. In some examples, each of the arbitrator circuits 240[1]-240[3] may include an initiator and a regulator that may adjust an output rate of those requests (e.g., the requests R1[1]-R1[3]) according to the control of the traffic scheduling circuit 230 (e.g., the control signals VC1-VC3).

The traffic scheduling circuit 230 may analyze the requests R1[1]-R1[3] to generate those control signals VC1-VC3. In some embodiments, the traffic scheduling circuit 230 may be implemented with a traffic scheduling circuitry in the second patent document, which may generate the control signals VC1-VC3 according to QoS levels of the requests R1[1]-R1[3], access expiration values, upper limit of the number of outstanding requests, and performance delay information. Detailed configurations and operations of the traffic scheduling circuit 230 may be understood withe reference to the second patent document, and will not be further given herein.

In this example, as the performance of the first set of devices 1[1] has the highest sensitivity to the access delay time of the memory 150, the arbitrator circuit 240[1] that receives the requests R1[1] from the first set of devices 1[1] may be coupled to the transmission circuit 220[1] via a path P1, and coupled to the transmission circuit 220[2] via a path P2, in which the paths P1 and P2 are lowest delay paths in the traffic control circuitry 120. For example, the path P1 is coupled to the memory 150 only via one transmission circuit (e.g., the transmission circuit 220[1]) and one target agent circuit (e.g., the target agent circuit 210[1] or 210[2]). Similarly, the path P2 is coupled to the memory 150 only via one transmission circuit (e.g., the transmission circuit 220[2]) and one target agent circuit (e.g., the target agent circuit 210[3] or 210[4]). In other words, the traffic control circuitry 120 is able to utilize the paths P1 and P2 that have the lowest delay structurally to connect the first set of devices 1[1] to the memory 150. As a result, the performance requirements of the first set of devices 1[1] for minimum access delay time of the memory 150 may be met as much as possible to maintain the performance of the first set of devices 1[1].

In some embodiments, due to actual layout locations and timing constraints, the traffic control circuitry 120 may further include buffer circuits (not shown). These buffer circuits may be coupled between the arbitrator circuits 240[1]-240[3] and the target agent circuits 210[1]-210[4] to perform pipelined operations. Under this condition, the circuits related to the first set of devices 1[1] (e.g., the transmission circuits 220[1] and 220[2]) may be set to be located adjacent to the central channel of the memory 150, in order to reduce the number of the buffer circuits. As a result, the delay for the first set of devices 1[1] accessing the memory 150 is able to be further decreased.

Figure 3:
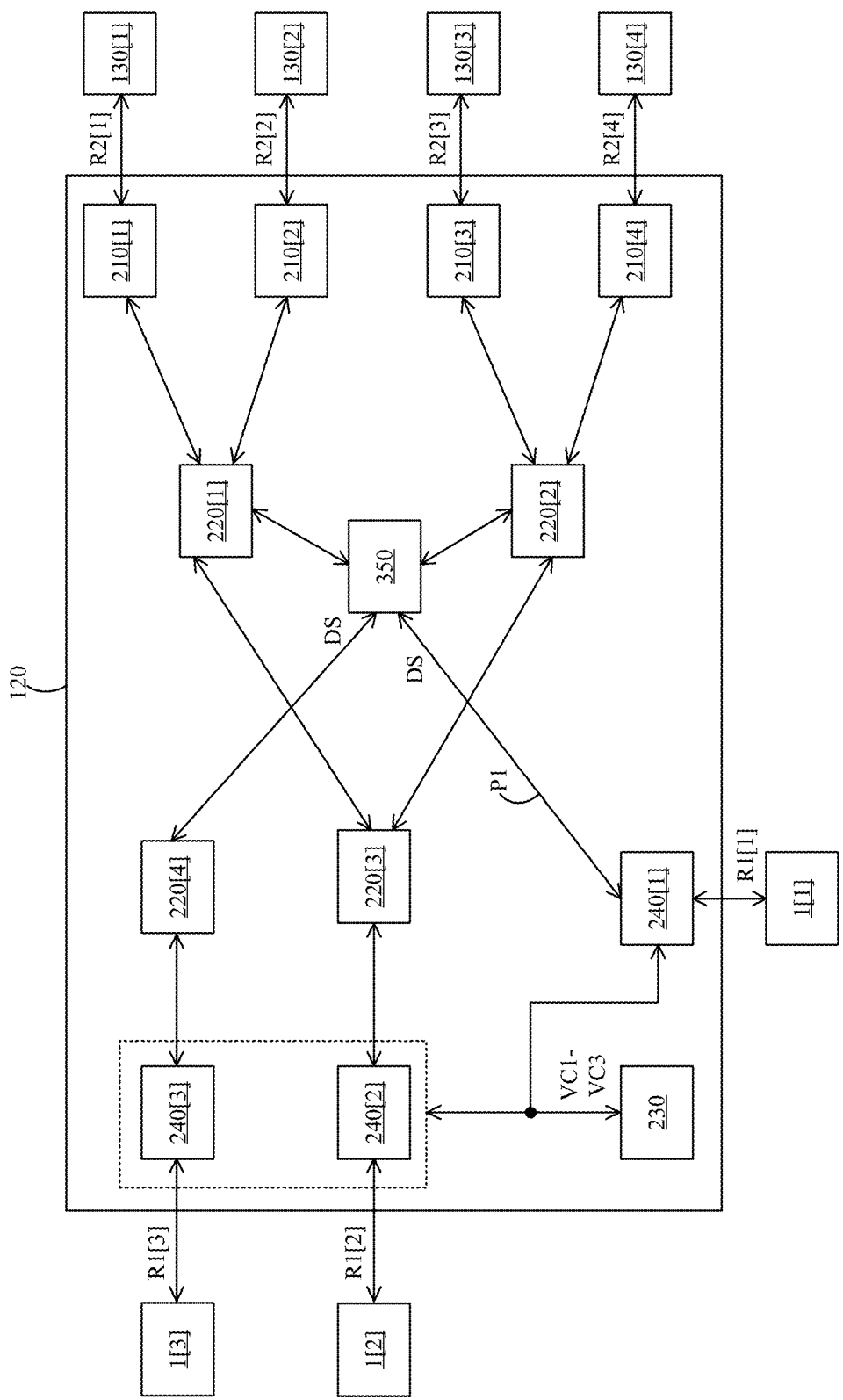
FIG. 3 illustrates a schematic diagram of the traffic control circuitry in FIG. 1A or 1B according to some embodiments of the present disclosure.

FIG. 3 illustrates a schematic diagram of the traffic control circuitry 120 in FIG. 1A or 1B according to some embodiments of the present disclosure. Similar to examples in FIG. 2, for ease of understanding, in examples of FIG. 3, the value of m is 4 and the value of n is 3, but the present disclosure is not limited thereto. Compared with the examples in FIG. 2, in this example, the traffic control circuitry 120 further includes a last-level cache memory 350.

In this example, the arbitrator circuit 240[1] and the transmission circuit 240[4] are adjusted to be coupled to the last-level cache memory 350. The last-level cache memory 350 may be utilized by at least one set in the sets of devices 1[1]-1[3]. For example, the last-level cache memory 350 may be coupled to the first set of devices 1[1] and the third set of devices 1[3] to receive the reordered requests R1[1] and R1[3]. In some applications, some devices may share certain data and store the data in the last-level cache memory 350. For example, certain devices in the first set of devices 1[1] and/or the third set of devices 1[3] may store the shared data (denoted as data DS) in the last-level cache memory 350. When the data to be accessed in response to the request R1[1] or R1[3] is the data DS stored in the last-level cache memory 350, the last-level cache memory 350 may subsequently return the corresponding data DS, eliminating the need to access the memory 150. As a result, the overall system performance can be further improved. If the data to be accessed in response to the request R1[1] or R1[3] is not the shared data stored in the last-level cache memory 350, the last-level cache memory 350 may transmit this request to the transmission circuit 220[1] or the transmission circuit 220[2].

The circuit configurations illustrated in FIGS. 2 and 3 are given for illustrative purposes, and the present disclosure is not limited thereto. Various configuration capable of achieving analogous functionality and/or operations are within the contemplated scope of the present disclosure.

Figure 4:
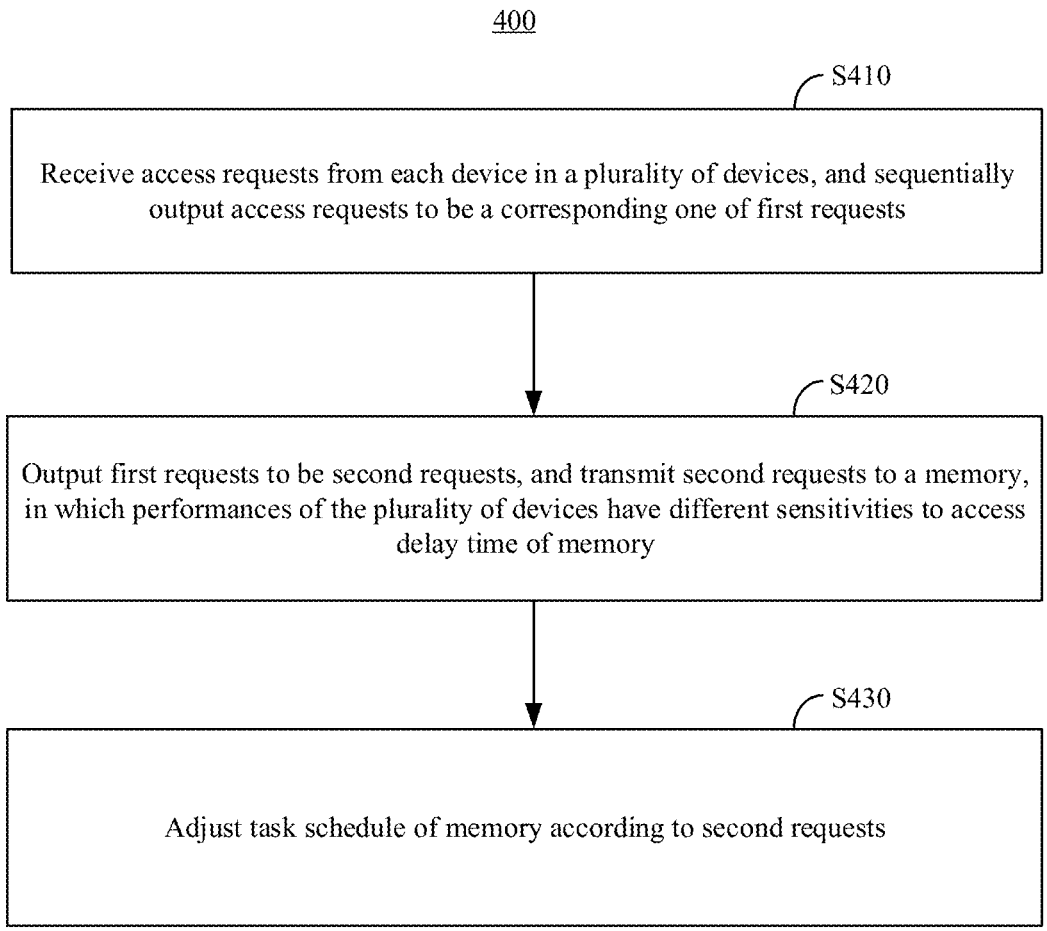
FIG. 4 illustrates a flow chart of a memory control method according to some embodiments of the present disclosure.

FIG. 4 illustrates a flow chart of a memory control method 400 according to some embodiments of the present disclosure. In operation S410, access requests from each device in a plurality of devices are received, and the access requests are sequentially outputted to be a corresponding one of first requests. In operation S420, the first requests are outputted to be second requests, and the second requests are transmitted to a memory, in which performances of the plurality of devices have different sensitivities to an access delay time of a memory. In operation S430, a task schedule of the memory is adjusted according to the second requests.

The above operations of the memory control method 400 can be understood with reference to above embodiments, and thus the repetitious descriptions are not further given. The above description of the memory control method 400 includes exemplary operations, but the operations of the memory control method 400 are not necessarily performed in the order described above. Operations of the memory control method 400 may be added, replaced, changed order, and/or eliminated, or the operations of the memory control method 400 may be executed simultaneously or partially simultaneously as appropriate, in accordance with the spirit and scope of various embodiments of the present disclosure.

As mentioned above, the memory control system and the memory control method in some embodiments of the present disclosure may utilize front-end circuitries to divide at least one device with similar or identical sensitivity in multiple devices into the same set. As a result, it is able to reduce the overall control complexity at the system level and accomplish the control of multi-channel memory under a unified memory architecture.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A memory control system, comprising:
    a plurality of front-end circuitries, wherein each of the plurality of front-end circuitries is configured to receive a plurality of access requests from a corresponding device in a plurality of devices, and sequentially output the plurality of access requests to be a corresponding first request of a plurality of first requests that are respectively associated with the plurality of devices;
    a traffic control circuitry configured to reorder the plurality of first requests and generate a plurality of second requests according to the reordered plurality of first requests; and
    a plurality of back-end circuitries configured to adjust a task schedule of a memory according to the plurality of second requests, wherein performances of the plurality of devices have different sensitivities to an access delay time of the memory.

2. The memory control system of claim 1, wherein the plurality of devices are divided into a plurality of sets of devices, and a performance of at least one device in the same set of devices within the plurality of sets of devices has similar or the same sensitivity to the access delay time of the memory.

3. The memory control system of claim 2, wherein a first set of devices in the plurality of sets of devices is coupled to the memory via a lowest delay path in the traffic control circuitry, and a performance of the first set of devices has a highest sensitivity to the access delay time of the memory.

4. The memory control system of claim 1, wherein the traffic control circuitry comprises:
    a plurality of target agent circuits configured to output the reordered plurality of first requests to be the plurality of second requests;
    a plurality of transmission circuits coupled to the plurality of target agent circuits, and configured to output the reordered plurality of first requests to the plurality of target agent circuits;
    a traffic scheduling circuit configured to analyze the plurality of first requests to generate a plurality of control signals; and
    a plurality of arbitrator circuits respectively coupled to the plurality of devices, and configured to reorder the plurality of first requests according to the plurality of control signals, and transmit the reordered plurality of first requests to the plurality of transmission circuits.

5. The memory control system of claim 4, wherein the traffic control circuitry further comprises:
    a last-level cache memory coupled to at least one device in the plurality of devices via a corresponding one of the plurality of arbitrator circuits, and configured to transmit shared data to the at least one device according to at least one of the plurality of first requests that is issued from the at least one device.

6. The memory control system of claim 5, wherein the at least one device comprises a central processing unit or a graphics processing unit.

7. The memory control system of claim 1, further comprising:
    a plurality of data buffer circuits, wherein a corresponding back-end circuitry in the plurality of back-end circuitries is further configured to temporarily store data read from the memory to a corresponding data buffer circuit in the plurality of data buffer circuits according to a corresponding one of the plurality of second requests.

8. The memory control system of claim 7, wherein at least two of the plurality of back-end circuitries share one of the plurality of data buffer circuits.

9. The memory control system of claim 8, wherein the memory comprises a plurality of channels, and the at least two of the plurality of back-end circuitries are coupled to the memory via at least two adjacent channels in the plurality of channels.

10. The memory control system of claim 7, wherein the plurality of back-end circuitries are configured to temporarily store the data to the corresponding data buffer circuit when the data is unable to be transmitted to the traffic control circuitry.

11. The memory control system of claim 1, wherein the plurality of devices are divided into a plurality of sets of devices, each of the plurality of front-end circuitries is coupled to a set of devices that comprises the corresponding device in the plurality of sets of devices via a plurality of connection ports respectively, and is configured to adjust an output sequence of the plurality of access requests according to a plurality of quality of service levels of the plurality of connection ports.

12. A memory control method, comprising:
   receiving a plurality of access requests from each device in a plurality of devices, and sequentially outputting the plurality of access requests to be a corresponding first request of a plurality of first requests that are respectively associated with the plurality of devices;
   reordering the plurality of first requests, generating a plurality of second requests according to the reordered plurality of first requests, and transmitting the plurality of second requests to a memory, wherein performances of the plurality of devices have different sensitivities to an access delay time of the memory; and
   adjusting a task schedule of the memory according to the plurality of second requests.

13. The memory control method of claim 12, further comprising:
   dividing the plurality of devices into a plurality of sets of devices,
   wherein a performance of at least one device in the same set of devices within the plurality of sets of devices has similar or the same sensitivity to the access delay time of the memory.

14. The memory control method of claim 13, further comprising:
   coupling a first set of devices in the plurality of sets of devices to the memory via a lowest delay path,
   wherein a performance of the first set of devices has a highest sensitivity to the access delay time of the memory.

15. The memory control method of claim 12, wherein reordering the plurality of first requests, generating the plurality of second requests according to the reordered plurality of first requests, and transmitting the plurality of second requests to the memory comprises:
   outputting the reordered plurality of first requests to a plurality of transmission circuits according to a plurality of control signals;
   outputting, by the plurality of transmission circuits, the reordered plurality of first requests to a plurality of target agent circuits;
   outputting, by the plurality of target agent circuits, the reordered plurality of first requests to be the plurality of second requests; and
   analyzing the plurality of first requests to generate the plurality of control signals.

16. The memory control method of claim 15, further comprising:
   transmitting, by a last-level cache memory, shared data to at least one device in the plurality of devices according to at least one of the plurality of first requests that is issued from the at least one device.

17. The memory control method of claim 12, wherein receiving the plurality of access requests from each device in the plurality of devices, and sequentially outputting the plurality of access requests to be the corresponding first request of the plurality of first requests that are respectively associated with the plurality of devices comprises:
   receiving the plurality of access requests via a plurality of connection ports; and
   adjusting an output sequence of the plurality of access requests according to a plurality of quality of service levels of the plurality of connection ports.

18. The memory control method of claim 12, further comprising:
   temporarily storing data read from the memory to a data buffer circuit according to a corresponding one of the plurality of second requests.

19. The memory control method of claim 18, wherein the plurality of second requests are issued from a plurality of back-end circuitries, and at least two of the plurality of back-end circuitries share the data buffer circuit.

20. The memory control method of claim 19, wherein the memory comprises a plurality of channels, and the at least two of the plurality of back-end circuitries are coupled to the memory via at least two adjacent channels in the plurality of channels.

* * * * *